(12) United States Patent
Huber et al.

(10) Patent No.: US 8,925,859 B2
(45) Date of Patent: Jan. 6, 2015

(54) CARGO DECK FOR RECEIVING A LOAD IN THE CARGO COMPARTMENT OF AN AIRCRAFT

(75) Inventors: Thomas Huber, Schliersee (DE); Richard Holzner, Rosenheim (DE)

(73) Assignee: Telair International GmbH (DE)

( * ) Notice: Subject to any disclaimer, the term of this patent is extended or adjusted under 35 U.S.C. 154(b) by 1414 days.

(21) Appl. No.: 10/565,081

(22) PCT Filed: Jul. 15, 2004

(86) PCT No.: PCT/EP2004/007919
§ 371 (c)(1),
(2), (4) Date: Aug. 30, 2006

(87) PCT Pub. No.: WO2005/012082
PCT Pub. Date: Feb. 10, 2005

(65) Prior Publication Data
US 2007/0007392 A1 Jan. 11, 2007

(30) Foreign Application Priority Data

Jul. 18, 2003 (DE) .................................. 103 32 798
Aug. 27, 2003 (DE) .................................. 103 39 507
Aug. 27, 2003 (DE) .................................. 103 39 508
Mar. 8, 2004 (DE) ........................... 10 2004 011 163
Mar. 8, 2004 (DE) ........................... 10 2004 011 164

(51) Int. Cl.
*B64C 1/18* (2006.01)
*B64C 1/06* (2006.01)
*B64C 1/20* (2006.01)
*B64C 1/22* (2006.01)
*B64D 9/00* (2006.01)
*B64D 11/02* (2006.01)
*B64D 11/00* (2006.01)

(52) U.S. Cl.
CPC . *B64C 1/068* (2013.01); *B64C 1/18* (2013.01); *B64C 1/061* (2013.01); *B64C 1/064* (2013.01); *B64C 1/065* (2013.01); *B64C 1/20* (2013.01); *B64C 1/22* (2013.01); *B64D 9/00* (2013.01); *B64D 11/02* (2013.01); *B64D 2011/0046* (2013.01)
USPC ..................................................... 244/118.1

(58) Field of Classification Search
CPC ..................................... B64C 1/20; B64C 1/18
USPC ................. 244/118.1, 118.2, 119, 120, 137.1
See application file for complete search history.

(56) References Cited

U.S. PATENT DOCUMENTS 2,412,778 A * 12/1946 Kosek ........................... 244/120
2,625,118 A * 1/1953 Lechner ........................ 410/104

(Continued)

FOREIGN PATENT DOCUMENTS

DE 21 62 042 A 7/1972
DE 201 22 116 U1 6/2004

*Primary Examiner* — Brian M O'Hara
(74) *Attorney, Agent, or Firm* — Barnes & Thornburg LLP

(57) ABSTRACT

In an aircraft there is customarily provided, for receiving a load in the cargo compartment, a cargo deck that comprises a plurality of ball mats, floor panels or similar flat floor elements. Also provided are a plurality of roller conveyors or similar profile elements mounted in the long direction of the aircraft to accommodate transport rollers, PDUs, latches or similar functional units for moving and fixing the load on the cargo deck. To simplify the arrangement and the assembly it is proposed in the present invention that the floor elements at least in sections be firmly connected to the profile elements to form a deck section that extends across the entire width of the cargo compartment, in such a way that longitudinal forces imposed on the deck section, in particular imposed by the load, oriented in the direction of an aircraft long axis and acting as shear forces in the surface direction of the cargo deck, can be transmitted to outer edges of the deck section and can be dissipated from the outer edges to an outer skin of the aircraft that is reinforced by ribs.

21 Claims, 10 Drawing Sheets

(56) References Cited

U.S. PATENT DOCUMENTS

| | | | |
|---|---|---|---|
| 3,381,921 A | 5/1968 | McDonough et al. | |
| 3,612,316 A * | 10/1971 | Baldwin et al. | 414/499 |
| 3,899,092 A * | 8/1975 | Nordstrom | 410/87 |
| 4,479,621 A * | 10/1984 | Bergholz | 244/117 R |
| 4,780,043 A * | 10/1988 | Fenner et al. | 414/502 |
| 4,875,645 A * | 10/1989 | Courter | 244/137.1 |
| 4,989,809 A * | 2/1991 | Arnold | 244/137.1 |
| 5,827,022 A * | 10/1998 | Tovani | 410/78 |
| 6,039,288 A * | 3/2000 | Huber et al. | 244/118.1 |
| 6,554,225 B1 * | 4/2003 | Anast et al. | 244/117 R |
| 7,338,013 B2 * | 3/2008 | Vetillard et al. | 244/117 R |
| 2006/0065781 A1* | 3/2006 | Kress et al. | 244/118.1 |
| 2007/0194175 A1* | 8/2007 | Kismarton et al. | 244/120 |
| 2008/0213058 A1* | 9/2008 | Simmons et al. | 410/46 |

\* cited by examiner

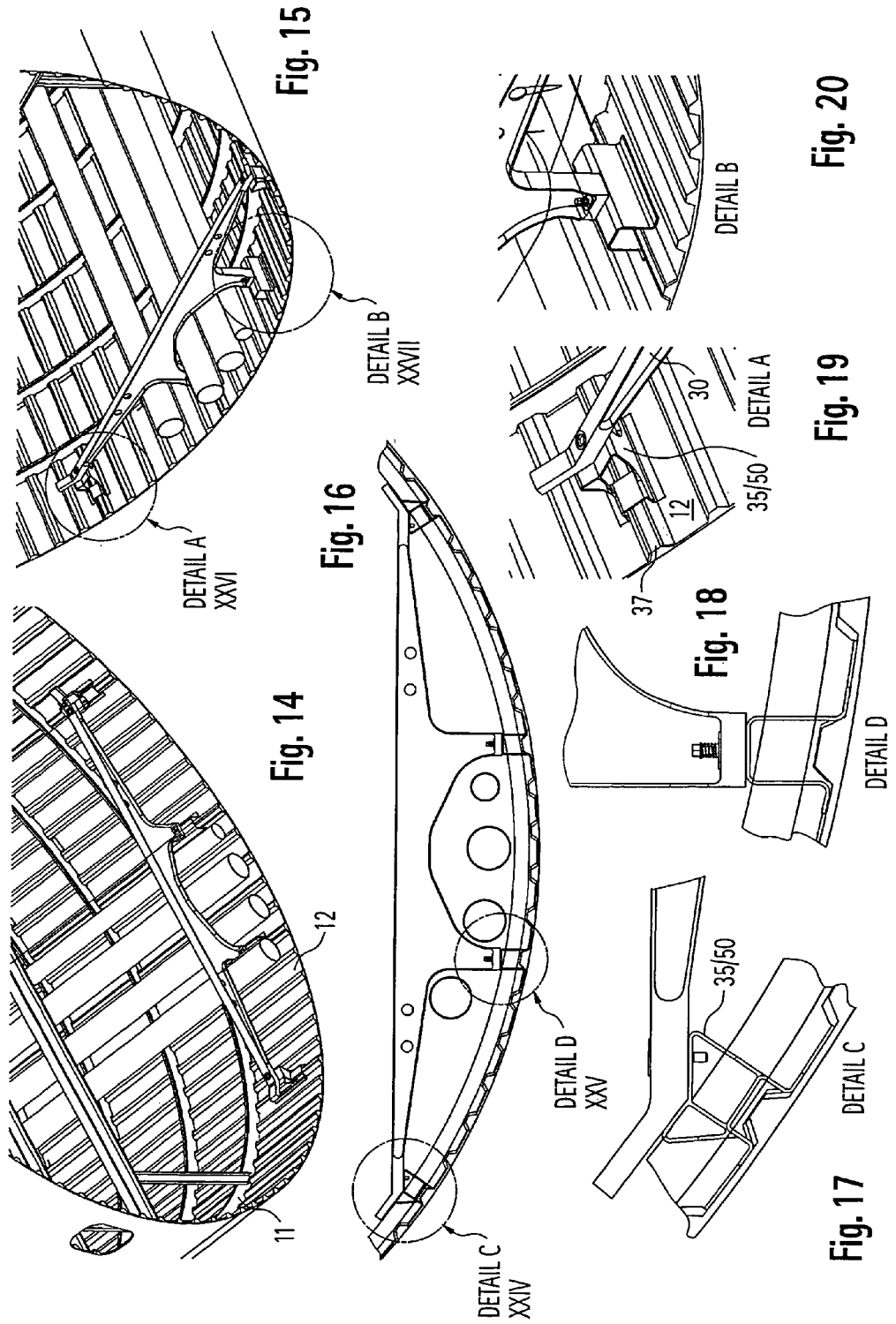

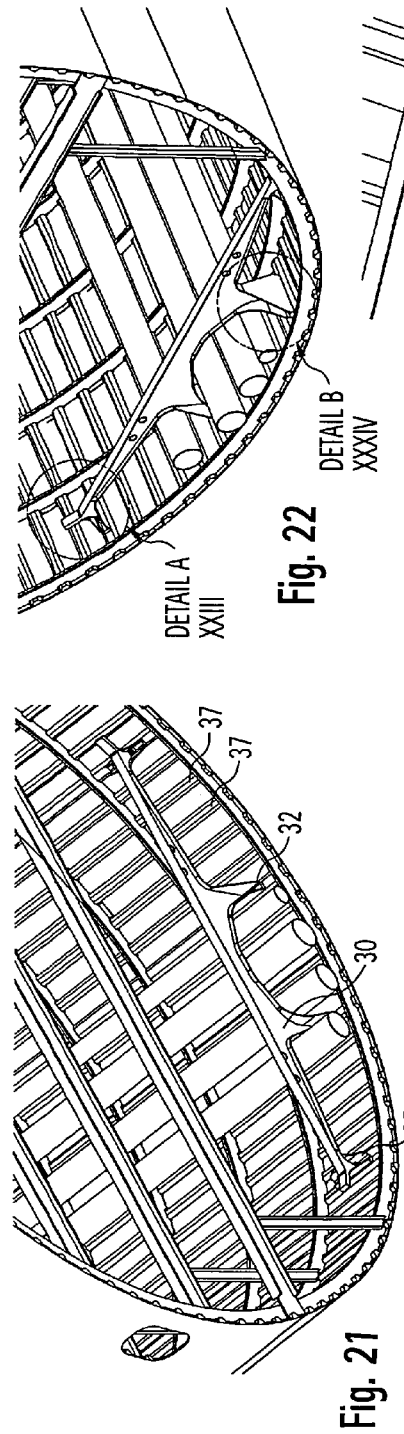
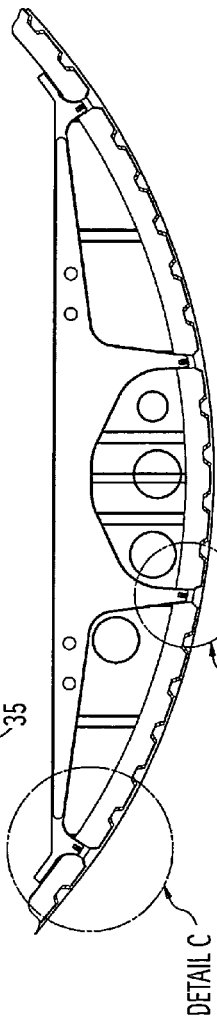
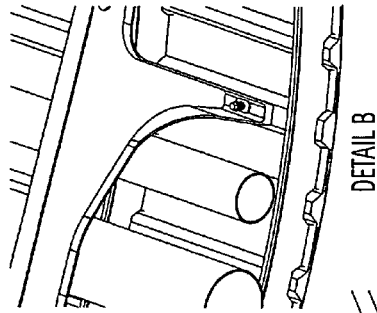
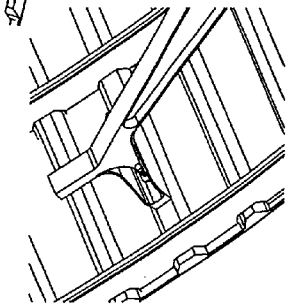
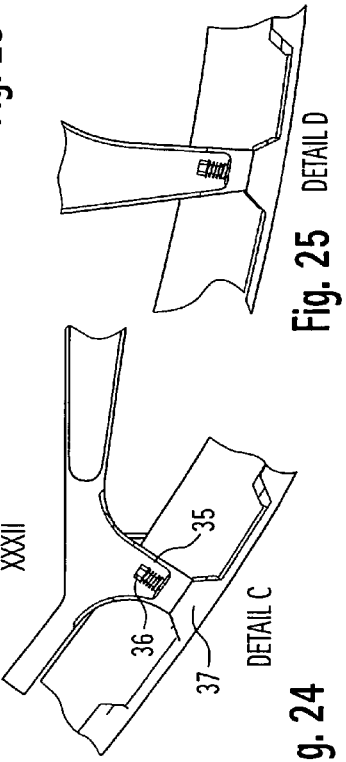

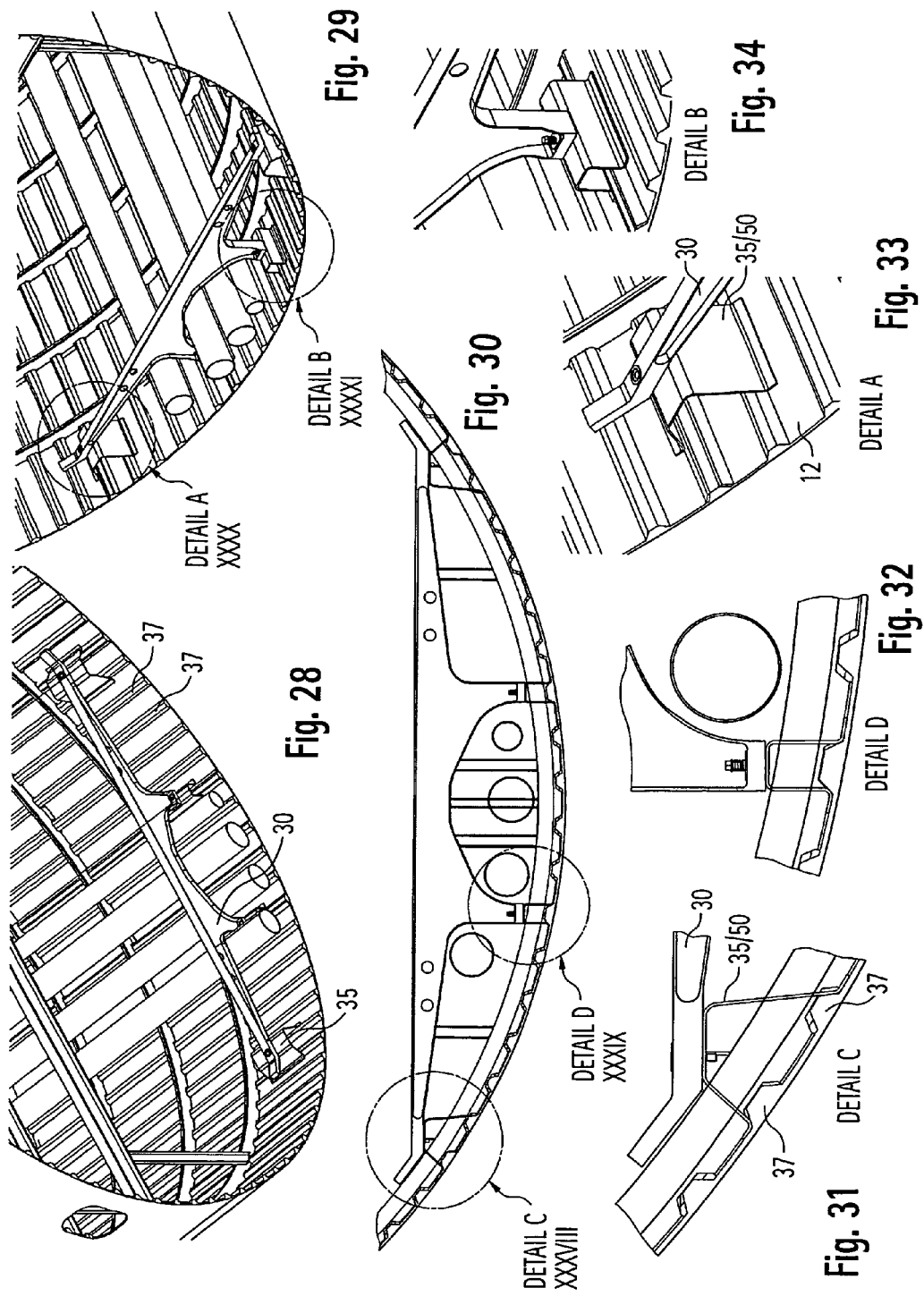

CARGO DECK FOR RECEIVING A LOAD IN THE CARGO COMPARTMENT OF AN AIRCRAFT

CROSS REFERENCE TO RELATED APPLICATIONS

This application claims priority to Patent Cooperation Treaty (PCT) Application No. PCT/EP2004/007919 filed on Jul. 15, 2004 entitled, "CARGO DECK FOR RECEIVING A LOAD IN THE CARGO HOLD OF AN AIRCRAFT," which claims priority to German Patent Application No. 103 32 798.3, filed Jul. 18, 2003; which claims priority to German Patent Application No. 103 39 507.5, filed Aug. 27, 2003; which claims priority to German Patent Application No. 103 39 508.3, filed Aug. 27, 2003; which claims priority to German Patent Application No. 10 2004 011 163.4, filed Mar. 8, 2004; which claims priority to German Patent Application No. 10 2004 011 164.2, filed Mar. 8, 2004; all of the above disclosures are herein incorporated by reference in their entirety.

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a cargo deck for receiving a load in the cargo compartment of an aircraft, according to the pre-characterizing clause of Claim 1.

BACKGROUND OF THE INVENTION

From the document DE AS 21 62 042 a cargo deck of this kind is known, in which in the region of a loading-space door a first section of the cargo deck is formed by a plurality of ball mats, PDUs and similar functional units. Adjacent to this entrance region are a plurality of floor panels, between or on which are disposed roller conveyors, latches and additional PDUs, so that items of freight such as containers can be transported in through the cargo-compartment door and then onward, in the long direction of the aircraft, to their final storage position. Once in the storage positions, the containers are anchored by means of latches.

When the aircraft is being accelerated or braked, large forces are imposed on the load and transmitted from there to the latches. Even during loading and unloading the situation is similar, because the containers must then be accelerated and slowed down.

It is now known that these longitudinal forces can be absorbed by providing one or more transverse beams, which extend across the entire cargo deck and to which are attached the profile elements to which the PDUs are anchored as well as the latches that receive or generate the longitudinal forces. The same applies to panels in which PDUs (or other latch elements) are mounted. These transverse beams receive the said longitudinal forces over their entire width and transmit them into the outer skin. In the region of the cargo-compartment door it is also known to provide separate, table-like structures on which the said ball mats are seated and the functional units stably mounted, and which serve to receive the forces.

The construction and the assembly of such a cargo deck are notably elaborate. Furthermore, to achieve sufficient stability the entire arrangement is extremely heavy.

BRIEF SUMMARY OF THE INVENTION

It is the objective of the invention to provide a cargo deck of the kind cited at the outset that is designed so as to achieve a simplification of the assembly process, accompanied by simplified construction and low weight.

According to the present invention there is provided a cargo deck to receive a load in an aircraft cargo compartment comprising a plurality of ball mats, floor panels or similar flat floor elements, and a plurality of roller conveyors or similar profile elements mounted in the long direction of the aircraft to receive transport rollers, PDUs, latches or similar functional units to move the load and fix it in position on the cargo deck, the floor elements, at least in sections, being firmly connected to the profile elements so as to form a deck section that extends across the entire width of the cargo compartment, so that longitudinal forces introduced in particular by the load, and hence imposed on the deck section in the direction of an aircraft long axis and acting as shear forces in the surface direction of the cargo deck, can be transmitted to outer edges of the deck section and dissipated from there to an outer skin of the aircraft.

A basis of the invention resides in the fact that the flat elements which are present in any case, namely the floor panels on which one can walk and/or the ball mats, together with the profile elements, which are also present in any case and in which are mounted the rollers to form roller conveyors as well as the latches and PDUs—all of which are initially intended to support vertical loads—now are connected so that as a whole they form a structural component that is stable and/or stiff with respect to shear forces (acting in the surface direction) and that because of this shear-force resistance is capable of transmitting longitudinal forces introduced over the entire surface to the outer edges of the deck section, from which it is then possible for these longitudinal forces to be dissipated into the outer skin of the aircraft. As a result it becomes possible to eliminate the transverse beams that were previously necessary and were elaborately configured so as to absorb these forces.

Preferably the cargo deck is subdivided in the direction of its long axis into several deck sections, which are decoupled from one another with reference to the longitudinal forces. Thus the longitudinal forces can be absorbed section by section and transmitted into the outer skin of the aircraft. In addition, with such a construction length changes of the deck sections with respect to the aircraft fuselage can easily be compensated by corresponding play between the individual deck sections.

Preferably intermediate elements are provided, which are fixed on one hand to the outer edges of the deck section concerned, and on the other hand to the outer skin for dissipation of the longitudinal forces. Such intermediate elements can be attached to the outer skin relatively simply prior to installation of the deck sections, and can then easily be connected to the deck sections while the latter are being installed. In this case these intermediate elements are preferably attached to the outer skin between ribs, so that the ribs remain substantially free from longitudinal forces.

The intermediate elements preferably have a direction-dependent stiffness such that longitudinal forces are transmitted more strongly than forces in other directions. Hence it is ensured that practically no forces perpendicular to the outer skin are transmitted into the skin.

The intermediate elements can be attached substantially directly to the outer edges of the deck sections. However, it is also possible for this attachment to involve intervening components. This would be the case, for example, if the deck sections still comprise transverse beams that receive forces acting perpendicular to the long axis, so as to form modules that can support large loads, in which case the deck sections can be attached to the intermediate elements by way of the transverse beams. Such modules are especially simple to install.

The intermediate elements are preferably disposed in the region of end corners of the deck sections and are short in comparison to the overall length of the deck sections. Hence relatively little effort is needed to connect the intermediate elements to the outer skin of the aircraft. Preferably in this case for each deck section two intermediate elements are attached to the end corners of an edge of the deck section that runs perpendicular to the long direction. This not only simplifies the structure; this construction also ensures that length changes of the deck sections with respect to the outer skin of the aircraft cannot generate any tensions between these two parts.

The measure already mentioned above, namely to construct the deck sections with transverse beams in order to form modules, increases their carrying capacity. The transverse beams in turn preferably comprise supporting feet for fixation to the ribs, so that vertical forces can be dissipated into the ribs.

Preferably each deck section comprises a transverse beam, the ends of which are connected to the outer skin for the transmission of longitudinal forces. In this case, therefore, one of the transverse beams is constructed so that its ends form the above-mentioned intervening elements.

Preferably the deck sections are attached at their side edges to longitudinal beams for dissipating forces in the direction perpendicular to the aircraft long axis, in which case the longitudinal beams in turn are attached to the ribs of the aircraft. This arrangement considerably facilitates the installation of the deck sections. Installation is further facilitated when the modules or deck sections are attached in the aircraft by way of rapid-closure elements or similar connecting means that are easy to close and to release again.

In the following, preferred embodiments of the invention are explained with reference to drawings, wherein

BRIEF DESCRIPTION OF THE DRAWINGS

FIG. 14 is a perspective drawing to explain the fixation of the transverse beams to the outer skin, FIG. 15 is a perspective drawing like that in FIG. 14, but viewed from another angle, FIG. 16 is a front view of the embodiment according to FIGS. 14 and 15, FIG. 17 is a detail view of the section XXIV in FIG. 16, FIG. 18 is a detail view of the section XXV in FIG. 16, FIG. 19 is a detail view in perspective of the section XXVI in FIG. 15, FIG. 20 is a detail view of the section XXVII in FIG. 15, FIGS. 21-27 are drawings corresponding to those in FIGS. 14-20, but of another embodiment of the invention, and FIGS. 28-34 are drawings corresponding to those in FIGS. 14-20 and 21-27, but of another embodiment of the invention.

DETAILED DESCRIPTION OF THE INVENTION

Figure 1:
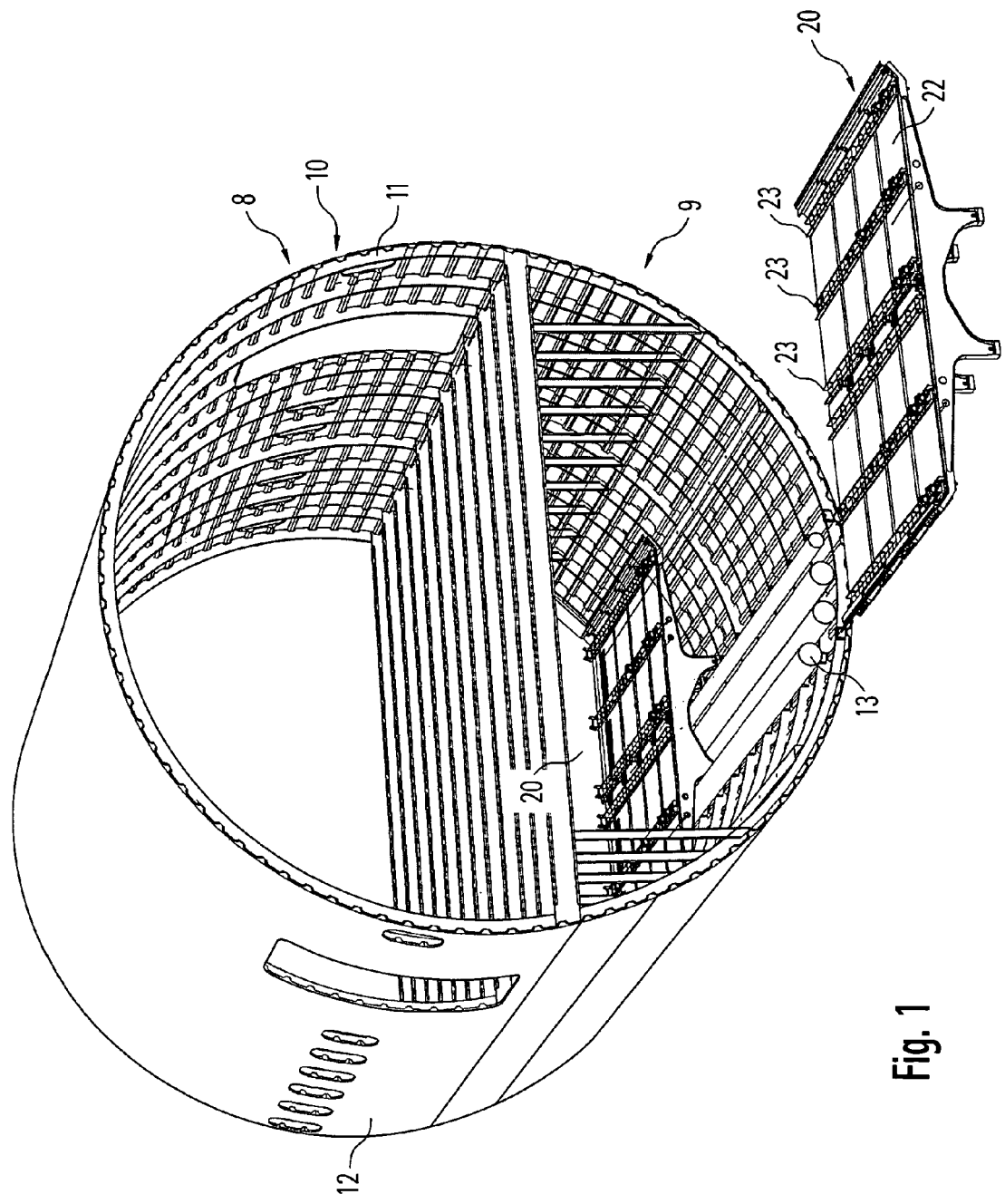
FIG. 1 is a perspective view of a fuselage section of an aircraft.

In the following description, the same reference numerals are used for identical parts or parts with identical actions.

As shown in FIG. 1, an aircraft fuselage 10 is subdivided (as is known) into an upper section 8 to be used as passenger compartment and a lower section to form a cargo compartment 9. The aircraft fuselage 10 is formed by an outer skin 12 that is reinforced by attaching ribs 11 to its inner surface. The outer skin and the ribs can be made of light metal or of a composite material.

Within the cargo compartment 9 are mounted deck sections 20 that together constitute a cargo deck. In the bilge space (below the deck sections 20) are disposed installation channels 13, conductors etc., which serve to supply both the passenger compartment and the cargo compartment with fluids (air, water, waste water, etc.) or electricity (as a source of energy, for data transmission, etc.).

Figure 2:
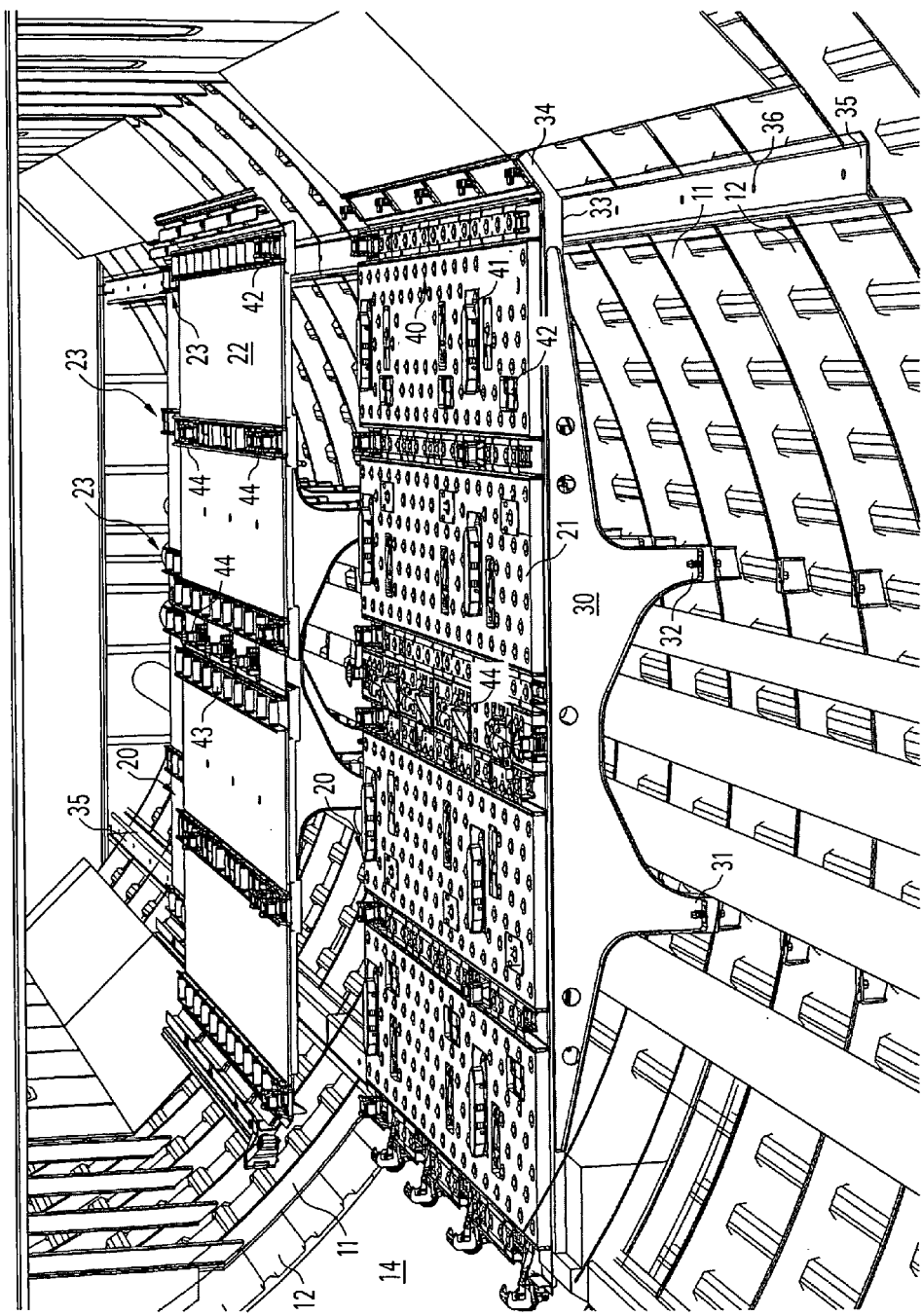
FIG. 2 is a perspective view of a cargo-loading compartment with deck sections partially installed.

As can be seen in FIG. 2, the deck sections 20 are made on one hand of flat elements such as floor panels 22 or ball mats 21, which are connected to one another by way of profile elements 23 oriented parallel to the long axis of the aircraft. These flat elements 21, 22 are preferably screwed or riveted to the profile elements 23, so as to produce a rigid structure extending over the entire width of the deck section 20. In the profile elements are fastened a plurality of functional units, e.g. PDUs 42 (roller drive units), transport rollers 43 or latches 44. In the region of a cargo-compartment door, and hence in the region of the ball mats 21, are additionally attached ball elements 40, guide elements 41 and a plurality of other PDUs 42 and latches 44, as is known per se.

For stiffening the deck sections 20 and transmitting vertically imposed loads, transverse beams 30 are provided below the flat elements 21, 22 and profile elements 23; these beams comprise feet 31, 32 and, at their outer edges, bearing surfaces 33. The feet 31, 32 of the transverse beams 30 are fixed to ribs 11, whereas the bearing surfaces 33 are seated on longitudinal profiles 35 that are attached to the ribs 11 along an outer zone of the aircraft fuselage. In addition, the transverse beams 30 comprise peripheral collars 34, to which are attached other guide elements for containers that will be received.

Figures 3, 4:
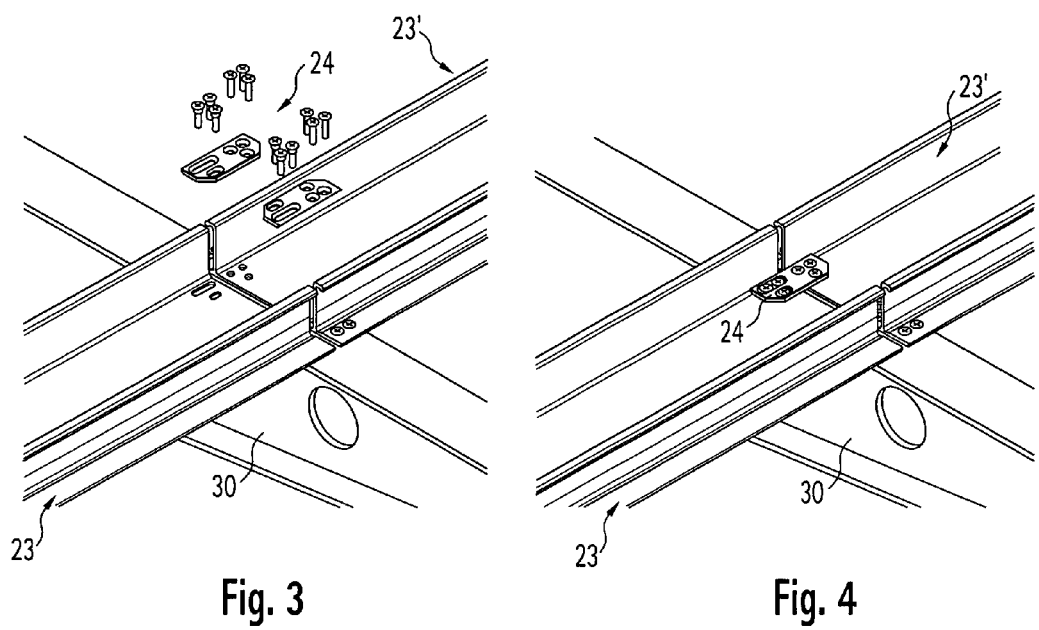
FIGS. 3 and 4 are perspective views showing the mounting of profile elements on transverse beams.

After the deck sections 20 have been installed in the loading space they are connected to one another by means of the profile elements 23, as shown in FIGS. 3 and 4. Connection elements 24 provided for this purpose have the form of slots, so that two deck sections 20 that have been coupled together can be shifted with respect to one another, by a certain amount, in the direction of the long axis of the aircraft.

Figure 5:
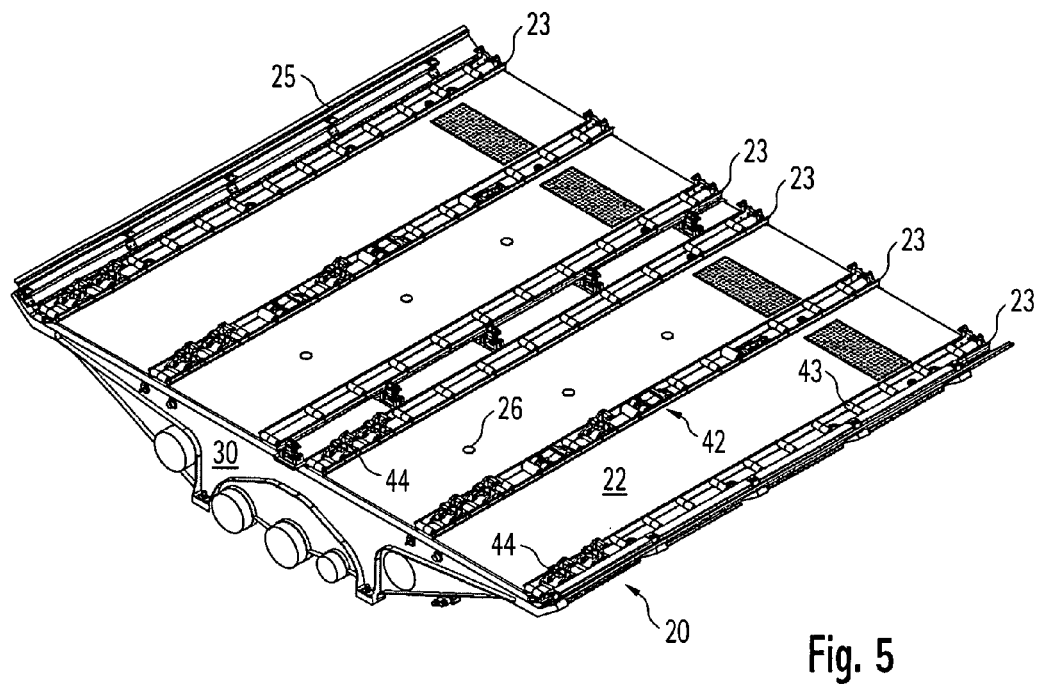
FIG. 5 is a perspective view of a floor module from above.
Figure 6:
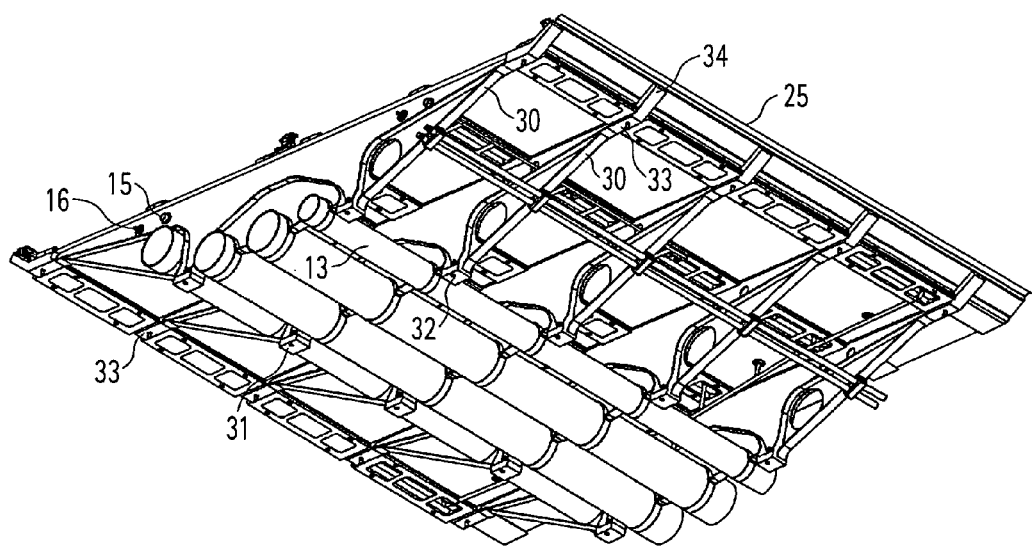
FIG. 6 shows the floor module according to FIG. 5 in perspective from below.

The deck sections 20 shown in FIGS. 5 and 6 form compact modules that consist on one hand of the flat sections 21 and/or 22, connected together by the profile elements 23, and on the other hand of the transverse beams 30. Furthermore, these modules can be provided in certain sections with the installation channels 13 as well as drainage conduits 16 (to remove water from the cargo deck) or with electrical leads, which can be connected to one another by way of connector sockets 15 between the modules.

The modular deck sections thus constructed are endowed with a stiffness with respect to shear forces, owing to the rigid connection between the flat sections 21, 22 and the profile elements 23, such that longitudinal forces, introduced for instance by way of latches 44 in the middle of a deck section (see FIG. 5), are transmitted outward, in the direction toward edge profiles 25 or the profile elements 23 disposed near the latter. From there these longitudinal forces—as is described below—are transmitted to the skin of the aircraft.

Figure 7:
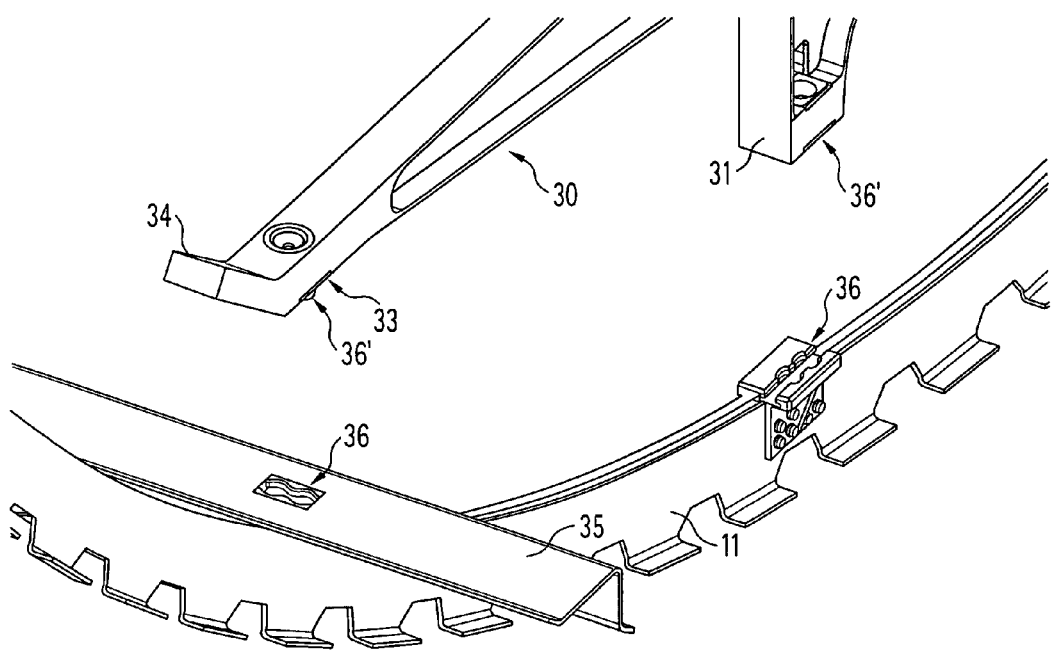
FIG. 7 is a sectional representation in perspective of the mounting of a transverse beam in the aircraft.

FIG. 7 shows how the transverse beams 30 are connected to the ribs 11 and/or longitudinal profiles 35 as the deck sections or modules are being installed in the cargo space. For this purpose, firstly there are provided, on the ribs 11 and longitudinal profiles 35, fixation elements 36 such as are known and have been well tested for use in the fixation of aircraft seats. Secondly, corresponding counter-fixation elements 36' are provided on the feet 31 and/or the bearing surfaces 33 of the transverse beams 30. This means that during installation of a deck section or module in the cargo compartment, the module need merely be lifted into the cargo compartment and fixed in place there by means of the fixation elements 36, 36'. Fixation of the transverse beams 30 to the longitudinal profiles 35 can be done from above, while for fixation of the feet 31 to the ribs 11 either access openings 26 (see FIG. 5) are provided in the floor panels 22 or the ball mats 21, or else at the important sites these elements are not yet fixedly attached to the profile elements during installation.

To transmit the longitudinal forces from the deck sections 20 to the outer skin 12 of the aircraft fuselage 10 intermediate elements 50 are provided, which in the following will be described in detail with reference to FIGS. 8-10. Furthermore, these intermediate elements 50 comprise on one hand an outer coupling piece 51, e.g. a band-shaped region, that is rigidly fixed to the outer skin 12 between two ribs 11, for instance by adhesive or rivets. In addition the intermediate element 50 comprises an inner coupling piece 52, which is connected to the peripheral profile 23 of a deck section 20 so that it cannot be pulled loose (in the direction of the aircraft long axis). The connecting piece 53 disposed between the inner coupling piece 52 and the outer coupling piece 51 is in turn stiff with respect to shear forces but relatively yielding with respect to bending forces, so that forces in the direction of the profile elements 23, i.e. in the long direction of the aircraft fuselage 10, are transferred from the profile elements 23 through the intermediate elements 50 to the outer skin 12, whereas forces perpendicular thereto, i.e. those acting downward and outward, are transferred only very slightly to the outer skin 12. Mounting of the intermediate elements 50 can be carried out especially simply when the elements comprise outer lobes 54 by way of which the intermediate elements 50 are fixed to the ribs 11.

The intermediate elements 50 are very short in relation to the overall length (in the aircraft long direction) of the deck sections 20, and in the example shown here they are provided at only one end of each outer profile element 23 of a deck section 20. This ensures that when the materials used for outer skin 12 and deck sections 20 are extended to different degrees, for instance owing to temperature differences, and have different coefficients of expansion, no tensions can arise between the outer skin and the deck sections 20. That is, in the long direction of the aircraft one end of each deck section 20 is fixed to the aircraft fuselage 10, whereas its other end is seated so as to be floating in the aircraft long direction. Only forces directed perpendicular to the long axis of the aircraft are transmitted over the entire length of the deck sections 20 in the aircraft fuselage 10.

Figure 8:
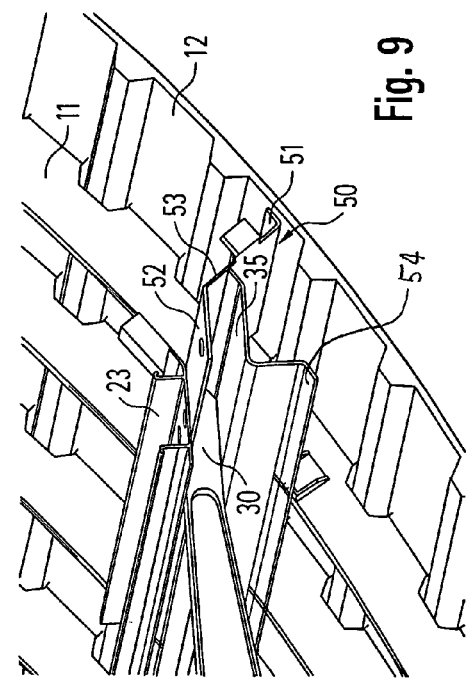
FIGS. 8 and 9 are perspective drawings of profile elements and intermediate elements, viewed from different directions.
Figure 9:
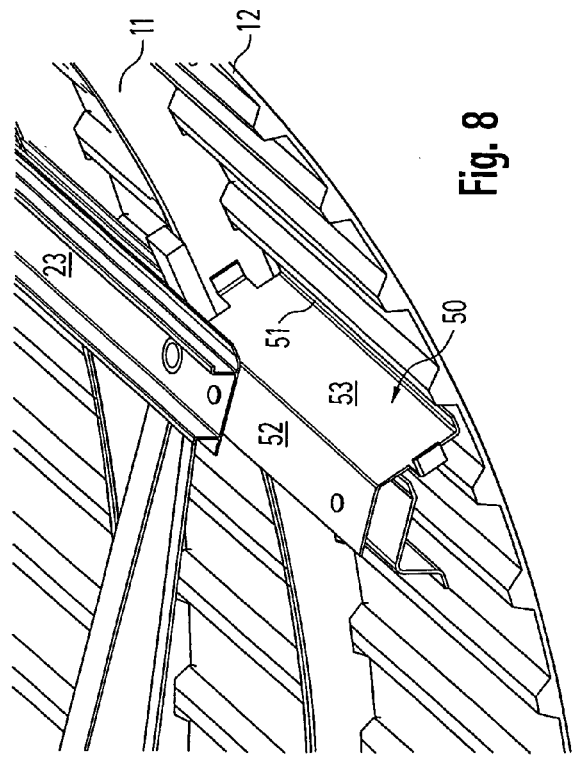
Figure 10:
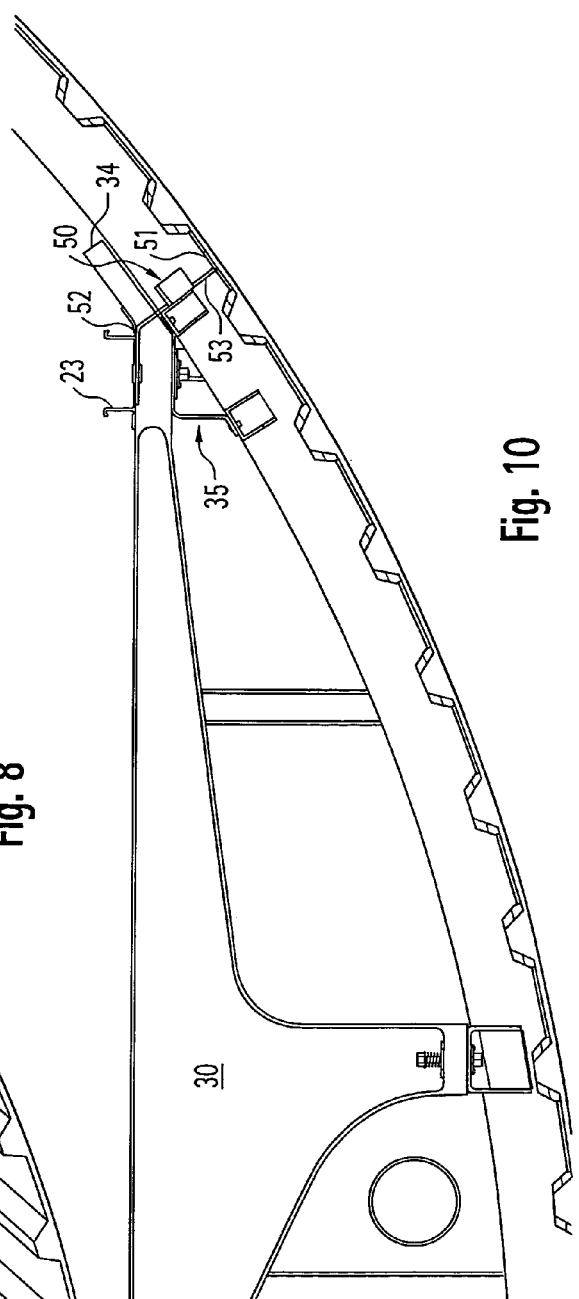
FIG. 10 shows the arrangement according to FIGS. 8 and 9 in a partial section viewed from the front.
Figure 11:
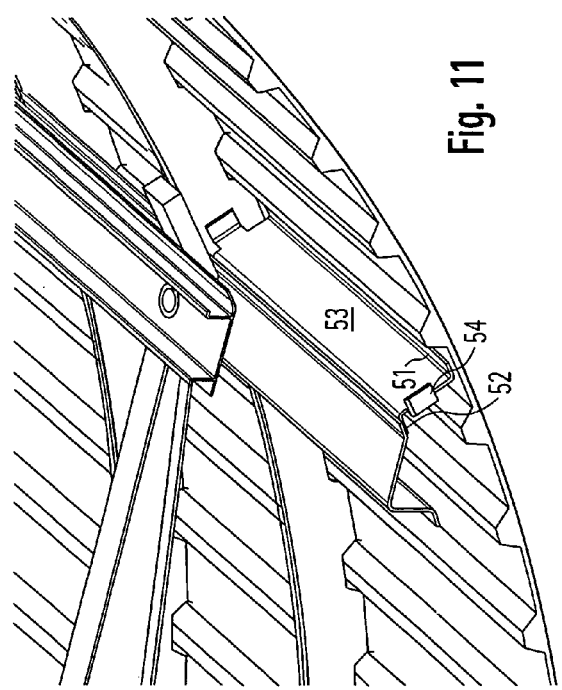
FIGS. 11-13 are views, corresponding to those in FIGS. 8-10, of a second embodiment of intermediate elements.
Figure 12:
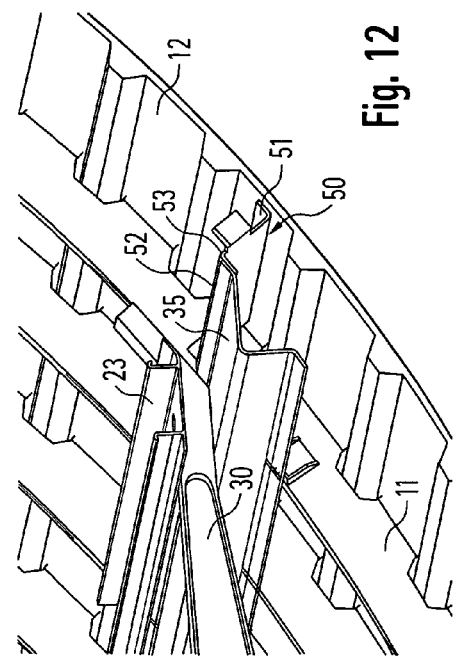
Figure 13:
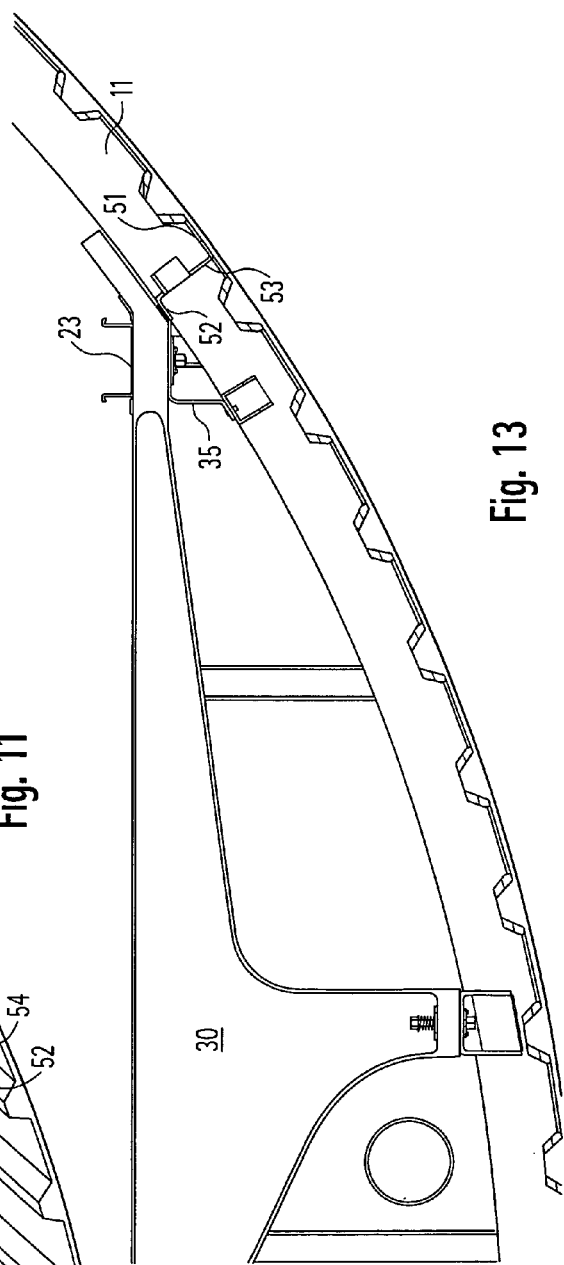

The embodiment of the invention shown in FIGS. 11-13 differs from the one in FIGS. 8-10 in that the intermediate elements 50 are coupled to the longitudinal profiles 35 on which are seated the deck sections 20 by way of the bearing surfaces 33 of their transverse beams 30, on which in turn the profile elements 23 are mounted. With this arrangement, therefore, the longitudinal forces are transmitted into the intermediate elements 50 not directly but rather by way of end sections of the transverse beams 30 and sections of the longitudinal profiles 35, and thus transmitted to the outer skin 12. With respect to function, however, there is no difference between this arrangement and the embodiment according to FIGS. 8-10, because also in this embodiment the transmission of longitudinal forces applied over the entire width of the deck sections 20 is initially outward into the outermost profile elements 23 situated there, followed by (substantially punctate) transfer to the intermediate elements 50 and on to the outer skin 12. Here again, therefore, the transverse beams 30 are not directly involved in the transmission of the longitudinal forces and hence can be constructed so that they are yielding or weak with respect to such forces.

In the following another way to attach the transverse beam 30 or longitudinal profile 35 to the outer skin is explained. At this juncture it should be emphasized that the outer skin concerned in the present description and shown in the drawings can also be "compact", e.g. constructed in sandwich form, so that the ribs 11 or other (customary) longitudinal elements for stiffening the outer skin 12 as shown in the drawings are no longer visible at least from outside the skin (if they are even present as structures at all), because the present procedure produces an outer skin that is smooth even on its inner surface.

The embodiment shown in FIGS. 14 to 20 is distinguished by the fact that the longitudinal profiles 35 or sections thereof, which thus serve as intermediate elements 50, each traverse a longitudinal stiffening element 37 before being connected to the outer skin 12. Here, again, the longitudinal beams 35 if suitably shaped can span the entire length of the aircraft, or can also be constructed as short sections (as shown in the drawings).

The embodiment of the invention shown in FIGS. 21-27 is distinguished by the fact that the longitudinal profile 35 is constructed as a "shoe", which is attached directly to the transverse beam 30 or is formed integrally therewith. This "shoe" is fixed to the longitudinal stiffening element 37 by way of fixation elements 36, as is particularly evident in FIGS. 24-27. As shown in the figures, this also applies to the feet 32 of the transverse beam 30.

In the embodiment of the invention shown in FIGS. 28-34 the longitudinal profiles 35 are as a whole constructed so as to traverse two longitudinal stiffening elements 32. In this case the longitudinal profiles 35 can either pass over the entire length of the aircraft interior or be only short sections (as can be seen in FIGS. 28 and 29), constructed as short, shoe shaped sections. They then represent, so to speak, intermediate elements 50 through which longitudinal forces are transmitted directly to the outer skin 12.

At this juncture it should once again be emphasized that a substantial point resides in the fact that the longitudinal forces are introduced over the entire floor regions and (as determined statically) are transferred to the outer skin at end corners of the floor modules and/or at ends of the transverse beams.

LIST OF REFERENCE NUMERALS

8 Upper section
9 Cargo compartment
10 Aircraft fuselage
11 Ribs
12 Outer skin
13 Installation channel
14 Cargo-compartment door
15 Connection socket
16 Drainage conduit
20 Deck section
21 Ball mat
22 Floor panel
23 Roller conveyor/profile element
24 Connection element
25 Edge profile
26 Access opening
27 Wall/ceiling lining
30 Transverse beam
31 Foot
32 Foot
33 Bearing surface
34 Collar
35 Longitudinal profile
36,36' Fixation element
37 Longitudinal stiffening element
40 Ball element
41 Guide element
42 PDU
43 Roller
44 Latches
50 Intermediate element
51 Outer coupling piece
52 Inner coupling piece
53 Connecting piece
54 Outer lobe

The invention claimed is:

1. A cargo deck for receiving a load in a cargo compartment of an aircraft, comprising:
a plurality of flat floor elements,
a plurality of functional units for moving and fixing said load to the cargo deck,
a plurality of roller conveyors mounted in the long direction of the aircraft and adapted to accommodate said functional units, at least sections of said flat floor elements being fixedly connected to said roller conveyors to form deck sections that each extends across the entire width of said cargo compartment,
a plurality of transverse beams for supporting the deck sections, each transverse beam having an outer end with a bearing surface adapted to be vertically supported by a rib of the aircraft,
the deck sections having two opposing outer edges each adjacent to an outer skin of the aircraft, each outer edge being directly and fixedly connected to a respective intermediate element with a non-moving joint and said respective intermediate element being directly and fixedly connected to the outer skin with a non-moving joint, each intermediate element having an outer coupling piece and an inner coupling piece, the outer and inner coupling pieces are not coplanar, the intermediate element having a long axis parallel to the long axis of said aircraft, the deck sections being each adapted such that longitudinal forces imposed on said deck section and oriented in a direction parallel to the long axis of said aircraft to act as shear forces in a surface direction of the cargo deck and these shear forces are transmitted directly to the outer edges of said deck section and dissipated from said outer edges to the outer skin of the aircraft via the intermediate elements,
wherein said cargo deck is subdivided in the direction of its long axis into a plurality of said deck sections, which are decoupled from one another with respect to said longitudinal forces.

2. A cargo deck according to claim 1, wherein intermediate elements are provided connected to said outer edges of said deck section and to said outer skin in order to transmit the longitudinal forces.

3. A cargo deck according claim 1, wherein said intermediate elements are respectively attached to said outer skin between adjacent ribs of said aircraft.

4. A cargo deck according to claim 1, said intermediate elements exhibit a stiffness that depends on the direction of a force applied thereto and are orientated, such that longitudinal forces are transmitted more strongly than forces in other directions.

5. A cargo deck according to claim 1, wherein said deck sections compromise modules that can support heavy loads, the deck sections being attached to said transverse beams.

6. A cargo deck according to claim 5 wherein said modules are attached within the aircraft by rapid-closure elements.

7. A cargo deck according to claim 1, wherein said transverse beams comprise one or more supporting feet located between the bearing surfaces for fixation to the rib of the aircraft.

8. A cargo deck according to claim 1, wherein said intermediate elements are spaced apart from one another and are connected to said deck sections in the region of end corners of said deck sections and are short in relation to an overall length of said deck sections.

9. A cargo deck according to claim 8, wherein at each deck section two intermediate elements are attached to said end corners of an edge of said deck section that extends perpendicular to the longitudinal direction.

10. A cargo deck according to claim 1, wherein said inner coupling piece of said intermediate element is attached to the outer end of the transverse beam in vertical alignment with the bearing surface of the outer end of the transverse beam.

11. A cargo deck according to claim 10, wherein said inner coupling piece is located between a roller conveyor and a top surface of the transverse beam such that the roller conveyor is connected to said inner coupling piece.

12. A cargo deck according to claim 10, wherein said inner coupling piece is located between the bearing surface of a transverse beam and a rib of the aircraft.

13. A cargo deck according to claim 1, comprising longitudinal beams and wherein said bearing surfaces of said transverse beams are attached to and vertically bear on said longitudinal beams.

14. A cargo deck according to claim 13, wherein said longitudinal beams are attached to said ribs of said aircraft.

15. A cargo deck module for a cargo deck of an aircraft, comprising:
a plurality of substantially planar floor elements, each having a major face, a first and a second, opposite side;
a plurality of elongate roller conveyors, each having a bottom portion, a first and second longitudinal side and a plurality of functional units for moving and securing a load to said cargo deck; and a plurality of transverse support elements, each having a substantially planar upper surface that extends along substantially an entire length of said transverse support element between a first outer end and a second outer end of the transverse support element, said first outer end and said second outer end of said transverse support element each including a bearing surface adapted to be vertically supported by a rib of the aircraft, wherein said first side of each of said plurality of substantially planar floor elements is adjacent and connected to said first longitudinal side of a respective one of said plurality of elongate roller conveyors, said second side of each of said plurality of substantially planar floor elements is adjacent and connected to said second longitudinal side of a respective other one of said plurality of elongate roller conveyors, each of said plurality of elongate roller conveyors is connected to each of said plurality of transverse support elements and extends in a direction substantially perpendicular to a longitudinal direction of each of said plurality of transverse support elements, and said substantially planar upper surface of each of said plurality of transverse support elements abuts said major face of each of said plurality of substantially planar floor elements and said bottom portion of each of said plurality of elongate roller conveyors; and a plurality of intermediate elements, each intermediate element having an outer coupling piece and an inner coupling piece, the outer and inner coupling pieces are not coplanar, the intermediate element having a long axis parallel to a long axis of said aircraft, the inner coupling piece being located between a bearing surface of a transverse support element and a rib of the aircraft, the cargo deck module having opposing outer edges adjacent to an outer skin of the aircraft, each outer edge being directly and fixedly connected to the outer skin via a respective intermediate element with a non-moving joint, wherein longitudinal forces imposed on the cargo deck module and oriented in a direction parallel to the long axis of the aircraft are transmitted as shear forces in a surface direction of the cargo deck module and these shear forces are transmitted directly to the outer edges and dissipated from said outer edges to the outer skin of the aircraft via the intermediate elements, wherein the cargo deck module is decoupled from another cargo deck module modules with respect to said longitudinal forces.

16. The cargo deck module of claim 15, wherein at least one second respective one of said plurality of elongate roller conveyors has a pair of walls, said plurality of functional units of said second respective one of said plurality of elongate roller conveyors being provided between said pair of walls, said pair of walls extending from and substantially perpendicular to a cargo deck surface defined by said plurality of substantially planar floor elements.

17. An aircraft having a cargo deck, said aircraft comprising:

a plurality of cargo deck modules defining said cargo deck, each of said plurality of cargo deck modules comprising:

a plurality of substantially planar floor elements, each having a first and a second, opposite side; and a plurality of elongate roller conveyors, each of said plurality of elongate roller conveyors having a first and second longitudinal side and a plurality of functional units for moving and securing a load to said cargo deck, each of said plurality of elongate roller conveyors extending in a longitudinal direction of said aircraft, wherein said first side of each of said plurality of substantially planar floor elements is adjacent and connected to said first longitudinal side of a respective one of said plurality of elongate roller conveyors, said second side of each of said plurality of substantially planar floor elements is adjacent and connected to said second longitudinal side of a respective other one of said plurality of elongate roller conveyors, each of said plurality of cargo deck modules extends across an entire width of said cargo deck, and a first one of said plurality of cargo deck modules is mounted in aircraft adjacent a second other of said plurality of cargo deck modules such that play in a longitudinal direction of said aircraft is provided between said first and second cargo deck modules; and a plurality of intermediate elements, each intermediate element having an outer coupling piece and an inner coupling piece, the outer and inner coupling pieces are not coplanar, the inner coupling piece being connected to a roller conveyor, the intermediate element having a long axis parallel to a long axis of said aircraft, the cargo deck module having opposing outer edges adjacent to an outer skin of the aircraft, each outer edge being directly and fixedly connected to the outer skin via a respective intermediate element with a non-moving joint, wherein longitudinal forces imposed on the cargo deck module and oriented in a direction parallel to the long axis of the aircraft are transmitted as shear forces in a surface direction of the cargo deck module and these shear forces are transmitted directly to the outer edges and dissipated from said outer edges to the outer skin of the aircraft via the intermediate elements, wherein the cargo deck module is decoupled from another cargo deck modules with respect to said longitudinal forces.

18. The aircraft of claim 17, wherein each respective one of said plurality of cargo deck modules comprises:

a plurality of transverse support elements, each having a substantially planar upper surface that extends across substantially an entire width of said cargo deck in a direction substantially perpendicular to a longitudinal direction said aircraft, wherein each of said plurality of elongate roller conveyors is connected to each of said plurality of transverse support elements, and said substantially planar upper surface of each of said plurality of transverse support elements abuts a major face of each of said plurality of substantially planar floor elements and is connected to a bottom portion of each of said plurality of elongate roller conveyors.

19. The aircraft of claim 17, wherein, for at least one respective one of said plurality of cargo deck modules, at least one second respective one of said plurality of elongate roller conveyors of said respective one of said plurality of cargo deck modules has a pair of walls, said plurality of functional units of said second respective one of said plurality of elongate roller conveyors being provided between said pair of walls, said pair of walls extending from and substantially perpendicular to a cargo deck surface defined by said plurality of substantially planar floor elements of said respective one of said plurality of cargo deck modules.

20. An aircraft having a cargo deck, said aircraft comprising:

a plurality of cargo deck modules defining said cargo deck, each of said plurality of cargo deck modules comprising:

a plurality of substantially planar floor elements, each having a first and a second, opposite side; and a plurality of elongate profile elements, each of said plurality of elongate profile elements having a first and second longitudinal side and a plurality of functional units for moving and securing a load to said cargo deck, each of said plurality of elongate profile elements extending in a longitudinal direction of said aircraft, wherein said first side of each of said plurality of substantially planar floor elements is adjacent and connected to said first longitudinal side of a respective one of said plurality of elongate profile elements, said second side of each of said plurality of substantially planar floor elements is adjacent and connected to said second longitudinal side of a respective other one of said plurality of elongate profile elements, and at least one of said plurality of cargo deck modules being fixed to said aircraft solely at one end of said at least one of said plurality of cargo deck modules in a longitudinal direction of said aircraft.

21. A cargo deck for receiving a load in a cargo compartment of an aircraft comprising:

a plurality of flat floor elements, a plurality of functional units for moving and fixing said load to the cargo deck, a plurality of roller conveyors mounted in the long axis of the aircraft and adapted to accommodate said functional units, a plurality of transverse beams;

wherein at least sections of said floor elements are fixedly connected to said roller conveyors to form deck sections that each extend across the entire width of the cargo compartment, wherein said transverse beams are arranged perpendicular to the long axis of the aircraft and said deck sections are attached to said transverse beams, wherein said aircraft comprises ribs extending perpendicular to said long axis of the aircraft, said outer ends of said transverse beams are attached to and vertically supported on said ribs by longitudinal beams extending transversely to the transverse beams, a plurality of intermediate elements fixedly connected to said outer edge of said deck section by means of a second connection, the intermediate elements being connected to an outer skin of the aircraft with a non-moving joint in order to transmit the longitudinal forces into said outer skin, the longitudinal forces being imposed on said deck sections and oriented in a direction parallel to the longitudinal axis of said aircraft.

* * * * *